Oct. 23, 1934.　　　R. E. WILLIAMS　　　1,977,930
DOLLY CONSTRUCTION
Filed May 27, 1933　　　3 Sheets-Sheet 1
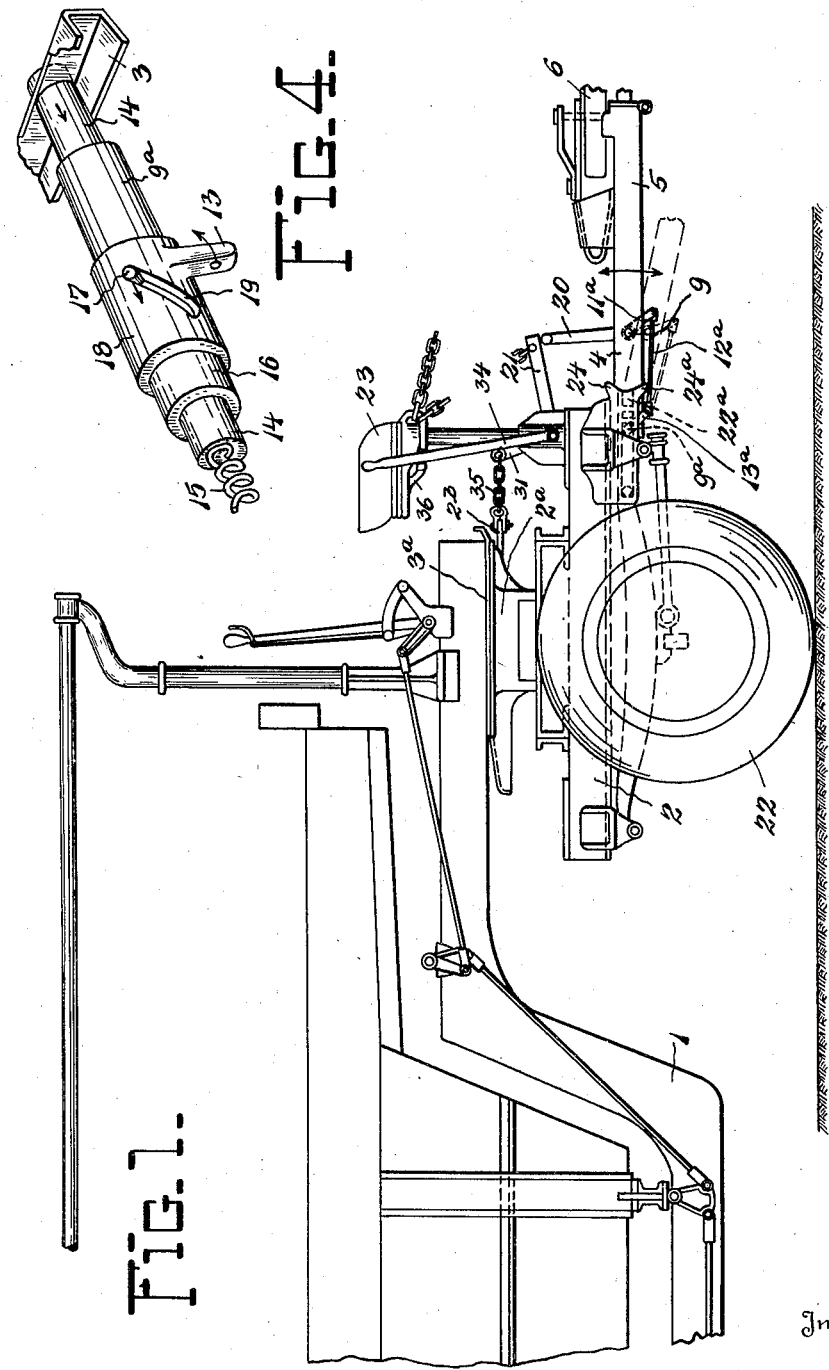
Inventor
ROY E. WILLIAMS
By Robb & Robb
Attorneys

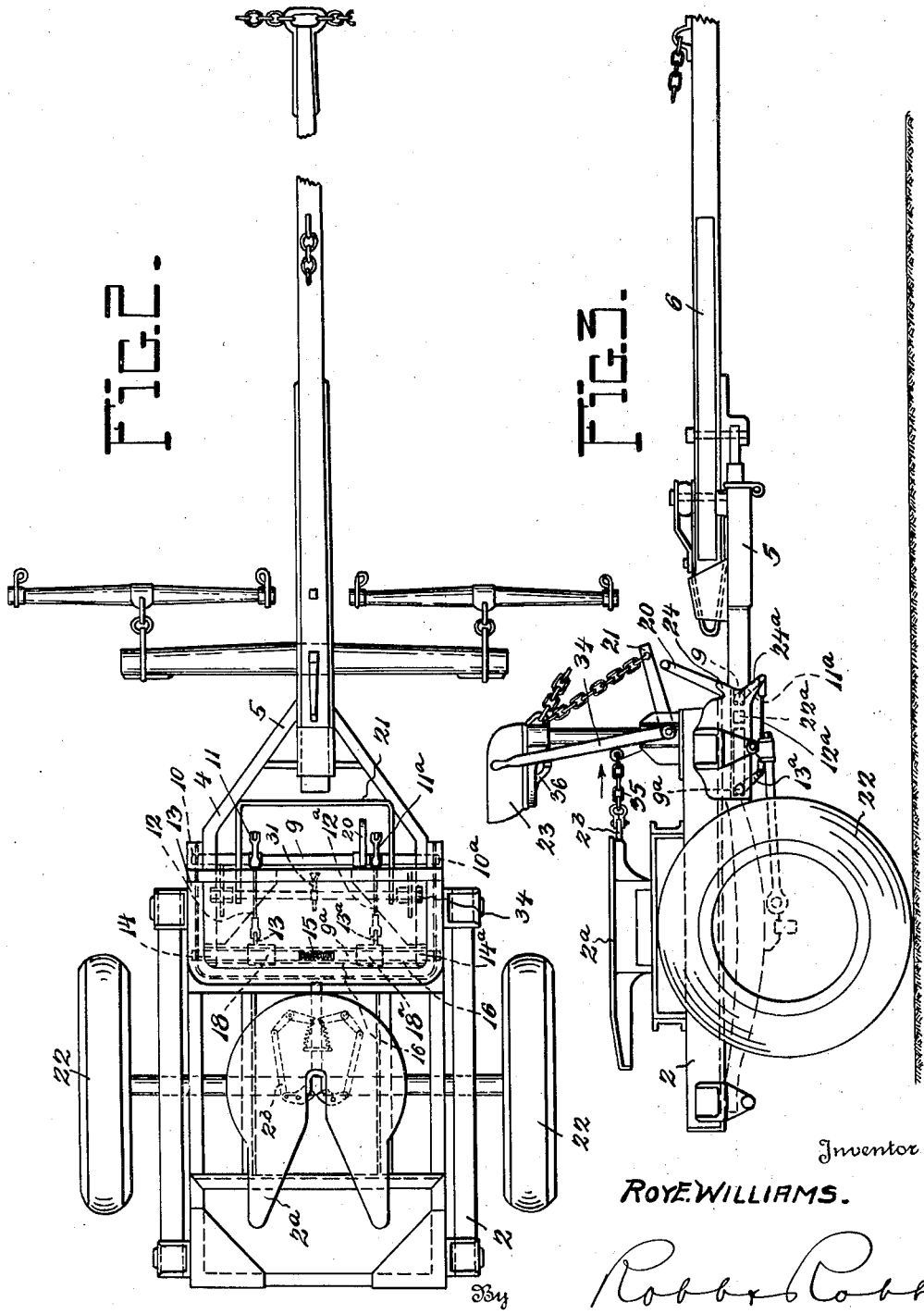

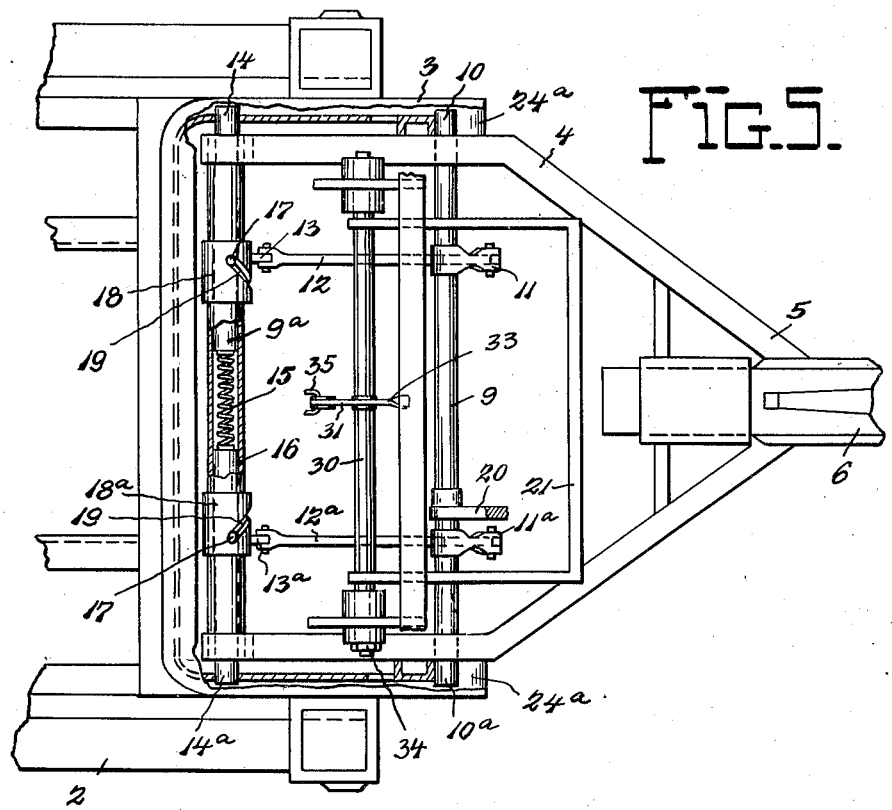
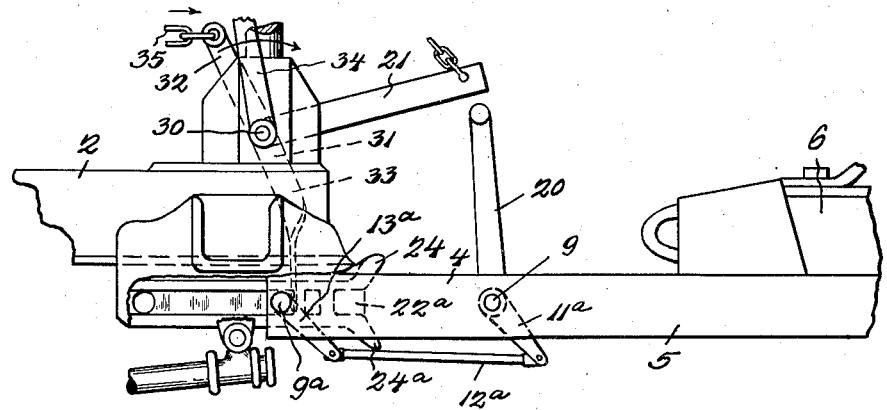

Patented Oct. 23, 1934

1,977,930

UNITED STATES PATENT OFFICE 1,977,930

DOLLY CONSTRUCTION

Roy E. Williams, Edgerton, Wis., assignor to Highway Trailer Company, Edgerton, Wis., a corporation Application May 27, 1933, Serial No. 673,296

22 Claims. (Cl. 280—33.4)

This application is a continuation in part of my patent application, Serial No. 586,226, filed January 12, 1932, for "Dolly construction".

In the use of vehicles of the well-known semi-trailer type, it is frequently necessary to move the trailer around without coupling a truck thereto. For this purpose a dolly is employed, being operated either manually or through the use of a team, or equivalent motive means.

The standard dolly construction embraces a pivoted lower fifth wheel mounting which is adapted to couple with the usual upper fifth wheel member of a trailer, the dolly frame being carried on a two-wheel support. When a team of horses is employed to move the dolly around, there is mounted a relatively long tongue on the drawbar of the dolly, so that when the dolly is coupled to the trailer, there is a tendency of the drawbar and tongue to fly upwardly or be forced downwardly, depending upon whether the weight of the trailer falls rearwardly or forwardly of the center of support of the dolly frame on the dolly wheels.

Because of the length of the drawbar and tongue, a considerable leverage results from the force exerted by this weight as it passes over dead center position. When a team is used, this force is transmitted through the harness to the horses, resulting in likelihood of injury to, or undue jars on the animals, and also when manually operated, the said turning moment is difficult to control, and constitutes a source of material danger to the operators, whose limbs have occasionally been broken by sudden movement of the tongue or draft appliance. This objection could be removed by pivotally mounting the drawbar, but in this event, a new objection would arise, in that it would be impossible to back the dolly, as the pivotal mounting would cause the drawbar to "jackknife", thus preventing any rearward movement.

The present improved construction overcomes these objections by providing a drawbar construction which is convertible from a rigid, or locked, position, to a pivoted position, and vice versa, which also provides a construction wherein there is no tendency to injure a team hitched to the dolly, and no possibility of "jack-knifing" or folding at the pivot point when the dolly is being backed.

The provision of such a convertible drawbar construction is one of the principal objects of this invention, which is further characterized by simplicity of construction details and complete avoidance of the objectionable possibilities above outlined; and further objects and advantages of the present construction will be apparent from a consideration of the following detailed description when taken with the accompanying drawings, in which—

Figure 1 is a side elevation of a semi-trailer to which is coupled a dolly incorporating the improved features of this invention.

Figure 2 is a plan view of the improved dolly, showing the drawbar in rigid position.

Figure 3 is a side elevation thereof, shown in somewhat more detail than Figure 1, and showing the drawbar in pivoted position.

Figure 4 is a perspective view of one of the locking units which will be described in more detail hereinafter.

Figure 5 is a plan view showing the details of the present construction, the drawbar being illustrated in rigid position.

Figure 6 is a side view of the structure of Figure 5 but showing the drawbar moved to pivoted position, and illustrating certain details of the mechanism for enabling the drawbar carrying member to be moved from rigid to pivoted position.

Referring more particularly to the drawings, 1 represents generally the frame of a semi-trailer, which is of usual construction and need not be herein described, and which is illustrated in Figure 1 as being coupled to a dolly, 2, embracing the improved construction, which will now be described, and provided with a lower fifth wheel member 2a adapted to couple with the usual upper fifth wheel member 3a of the trailer, and being rigidly mounted on the dolly, the lower fifth wheel member 2a being provided with the usual locking instrumentalities 2b adapted to lock the king pin of the upper fifth wheel member 3a of the trailer within the lower fifth wheel when the dolly and trailer are in coupled position. These locking instrumentalities may be of any conventional construction.

The frame of the dolly is open at its front to receive the U-shaped bracket-like guide member 3, which receives the drawbar 5, to which is fixedly connected the team tongue 6. The invention, however, is concerned with the construction of the drawbar frame and with the U-shaped guide member, which carries the drawbar frame, together with the drawbar.

The guide 3 is in the form of a channel member receiving the ends of certain guide shafts mounted within the drawbar frame 4, which is adapted to slide back and forth within the guide 3, subject to the release of locking mechanism hereinafter to be described.

Of the shafts above mentioned, the forward shaft 9 of the drawbar frame has its ends 10 and 10a resting in the guide 3, and which are adapted to slide within the guide as the frame 4 moves relative thereto. To the shaft 9 are suitably secured the lever arms 11 and 11a through the links 12 and 12a to lever arms 13 and 13a on the rear shaft structure 9a.

This rear shaft is a composite structure and constitutes the instrumentality permitting the adjustment of the drawbar for the fulfillment of the objects of this invention. This shaft structure comprises a pair of cooperating shafts 14 and 14a, held in proper yieldingly separated position by the spring 15 compressed between the two shafts, which spring tends to force the shafts away from each other. The shafts 14 and 14a and the spring 15 are enclosed in the rigid sleeve housing 16.

The lever arms 13 and 13a aforesaid form a part of the corresponding sleeves 18 and 18a, which are secured to the sleeve housing 16. Each of the sleeves 18 and 18a are provided with a cam-shaped slot 19, each pin 17 projecting through these cam-shaped slots to retract the shafts 14 and 14a upon actuation of the lever arms 13 and 13a.

The actuation of these arms and shafts is accomplished through a lever 20 secured to the forward shaft 9 in such a manner that the operation of the lever 20 rotates the shaft 9 to actuate the rear shafts 14 and 14a to retract these shafts against the spring 15. Operation of the foot pedal 20 actuates the parts thus described. The dolly is mounted on the wheels 22 for transportation thereof, and the foot rest 21 is suitably placed relatively to the operator's seat 23 to be conveniently accessible to the foot of the operator.

It will be understood that suitable openings are provided through the sides of the guide 3 to receive the shafts 14 and 14a, these openings being placed forwardly and rearwardly of the guides; and it will be further apparent that release of the shafts 14 and 14a, when operated in the manner above described, will release the frame 4 for sliding motion relatively to the guide or bracket 3. Therefore, when the shafts 14 and 14a are positioned in the rear openings of the guide, the front shaft 9 will be firmly supported in the guide 3, since its ends 10 and 10a rest in the channel of which the guide 3 is formed; and when the shafts 14 and 14a are operated to release them from the rear openings, and the frame 4 is moved forwardly until the shafts 14 and 14a are locked into the forward openings in the guide 3, the shaft 10 will be free from the guide and the tongue 6, the drawbar 5 and the frame 4 are then pivotally carried on the shafts 14 and 14a, which are free to rotate in the bracket, or guide, 3. Therefore, the arrangement permits either a rigid or a pivotal mounting for the tongue and drawbar whenever desired. In this connection, it may be noted that the spring 15 is of sufficient strength to operate the shafts 14 and 14a against the weight of the lever connections as soon as the pressure of the operator's foot is released from the pedal 20, so that the shafts 14 and 14a will be automatically snapped into their respective openings as soon as they are brought into registry therewith.

The operation of the device will therefore be apparent. For coupling the dolly to the trailer, a team is hitched to the dolly tongue and backed until the dolly is pushed under the front end of the trailer, when it is automatically locked with the king pin of the trailer, it being understood that the tongue and drawbar are in the rigid position. The usual supporting jack for the trailer is raised, and the driver then presses on the pedal 20, releasing the shafts 14 and 14a from their position in the rear openings in the guide 3, as already described. The team is then driven forward, and the frame 4, being released, moved forwardly until the shafts 14 and 14a register with the forward openings in the bracket guide 3. They then snap into these openings through the action of the spring 15, locking the frame 4, the drawbar and tongue in the forward, or pivot, position.

In the event that the shafts 14 and 14a do not, from any cause, exactly register with the openings therein, a lug member 22a is provided between the holes for the pivotal mounting and the end of the guide to prevent shafts 14, 14a from sliding entirely out of engagement with the guide 3, while, however, permitting the shaft 9 to enter the guide for rigidly positioning the frame 4 therein.

To uncouple the dolly from the trailer, the driver presses the pedal 20, releasing the mechanism, and backs the team. When the frame, drawbar and tongue reach the rearward position, the shafts 14 and 14a lock therein, rigidly securing the aforesaid parts. The trailer support jacks are lowered, the fifth wheel lock is released, and the team driven forward, pulling the dolly out from under the trailer.

There is thus obtained the full advantage of either a rigid or pivotal connection without the disadvantages of either, for there is no possibility of the tongue to fly up after coupling with the trailer, nor to forcibly drop, either of which actions will be conducive to injury to the team, and there is no possibility of the mechanism jackknifing during backing of the dolly, as would result if there were only a pivotal connection between the drawbar or tongue and the dolly.

In the following claims, the guide 3 is referred to as a bracket, in view of the fact that it is rigidly mounted to the dolly frame, and constitutes the sole supporting member for the frame 4 and associated parts. It will be understood that this term, therefore, includes any equivalent guide mounting in which the drawbar is supported for selective movement into and out of the locking, or rigid, and pivotal positions.

It will also be seen that the members hereinbefore referred to as shafts 14 and 14a, serve the functional purpose of locking members or bolts, these members operating to lock the frame 4 in either its rigid or pivotal position. In this connection also it may be noted that each end of the guide bracket 3 is provided with extending wings 24 and 24a which will serve to guide the forward shaft 9 into the bracket from extended position in the event that the drawbar and tongue have assumed a position outside of a true horizontal plane, thus assuring that at all times there will be positive coaction between the parts.

Mounted within the dolly structure there is a shaft 30 to which a lever 31 is keyed. The lever 31 comprises a portion 32 which is interconnected with the locking instrumentalities 2b by means of a chain 35 or the like. The lower portion 33 of the lever 31 extends downwardly within the frame structure of the dolly in such a manner as to abut against the sleeve housing 16 when the drawbar frame 4 of the dolly is in its pivoting or forward position while the lever 31 may be freely operated when the drawbar frame 4 is shifted to its rearward position so as to rigidly interlock with the dolly frame. A shift lever 34 is keyed upon the shaft 30 for rotation with the same and extends upwardly in close vicinity of the seat 23, so that the said shift lever may be easily reached by the operator.

It will therefore be seen that when the drawbar frame 4 is in its pivoting position and in the path of the lower portion 33 of the lever 31, the lever 31 will be locked against rotation in the direction of the arrow in Figure 6, and actuation of the locking instrumentalities within the lower fifth wheel member is prevented. Without this safety lever arrangement and in case the dolly and trailer are uncoupled while the drawbar frame 4 is in its pivoting position, the dolly would jackknife, thereby throwing the driver off the seat. When the drawbar frame 4 is moved to its fixed position within the dolly frame, the sleeve housing will assume its rearward position as shown in Figure 5, and will be out of the path of the lower portion 33 of the lever 31 and the shift lever 34 may now be shifted to cause a motion of the lever 31 in the direction of the arrow in Figure 6, thereby exerting a pull on the chain 35 in the direction of the arrow in Figure 3, so as to release the locking instrumentalities of the lower fifth wheel 2a to thereby permit the uncoupling of the dolly and trailer without any possibility of the dolly to jack-knife.

An abutment member 36 may be provided to limit the backward motion of the shift lever 34. This abutment member 36 may be mounted on the seat 23 and extends into the path of the shift lever 34.

It must be understood, of course, that in order to operate the lever 20, it is necessary to raise the foot rest 21 which is pivotally mounted on the shaft 30. The foot rest 21 serves therefore as a safety means to prevent accidental operation of the lever 20.

Having thus described my invention, what I claim as new and desire to secure by Letters Patent of the United States, is—

1. A device of the character described, comprising the combination with a dolly, of an adjustable drawbar mounting comprising a bracket fixedly mounted on the dolly, a drawbar carrying member mounted in the bracket for adjustable bodily movement therein relatively to the bracket, and instrumentalities for locking the drawbar carrying member in rigid draft and pivotal draft positions, selectively.

2. A device of the character described, comprising the combination with a vehicle frame, of an adjustable drawbar mounting comprising a carrying bracket secured to the frame, a drawbar carrying member mounted in the bracket and movable relatively thereto to assume incident to such movement rigid draft and pivotal draft positions, respectively, and instrumentalities for releasably locking the carrying member selectively in the respective positions.

3. A device of the character described, comprising the combination with a vehicle frame, of an adjustable drawbar mounting comprising a carrying bracket secured to the frame, a drawbar supporting member mounted in the bracket and adapted to assume rigid and pivotal positions, respectively, relatively to the bracket and frame, and instrumentalities for releasably locking the supporting member selectively in the respective positions, the instrumentalities including cooperating shafts carried by the drawbar supporting member, and adapted to interlock with the bracket at predetermined positions of adjustment of the supporting member, and mechanism for operating the shafts.

4. A device of the character described, comprising the combination with a vehicle frame, of an adjustable drawbar mounting comprising a carrying bracket secured to the frame, a drawbar supporting member mounted in the bracket and adapted to assume rigid and pivotal positions, respectively, relatively to the bracket and frame, and instrumentalities for releasably locking the supporting member selectively in the respective positions, the instrumentalities including cooperating shafts carried by the drawbar supporting member, and adapted to interlock with the bracket at predetermined positions of adjustment of the supporting member, and mechanism for operating the shafts, the said mechanism including a sleeve housing for the shafts, resilient means within the sleeve housing and between the shafts and exerting a force thereon to normally force the shafts apart for automatically interlocking them with the bracket, and means under control of an operator for retracting the shafts out of interlocking engagement with the bracket.

5. A device of the character described, comprising the combination with a vehicle frame, of an adjustable drawbar mounting comprising a carrying bracket secured to the frame, a drawbar supporting member mounted in the bracket and adapted to assume rigid and pivotal positions, respectively, relatively to the bracket and frame, and instrumentalities for releasably locking the supporting member selectively in the respective positions, the instrumentalities including cooperating shafts carried by the drawbar supporting member and adapted to interlock with the bracket at predetermined positions of adjustment of the supporting member, and mechanism for operating the shafts, the said mechanism including a sleeve housing for the shafts, resilient means within the sleeve housing and between the shafts and exerting a force thereon to normally force the shafts apart for automatically interlocking them with the bracket, and means under control of an operator for retracting the shafts out of interlocking engagement with the bracket, the said means including a sleeve for each shaft secured to the sleeve housing, the housing and sleeves being provided with registering cam-shaped slots, a pin on each shaft projecting through each pair of the registering cam-shaped slots, a lever member on each sleeve, and instrumentalities for simultaneously exerting a pulling force on the levers to turn the sleeves, thereby pulling each pin through its respective slots to retract each shaft from its locking position.

6. A device of the character described, comprising the combination with a vehicle frame, of an adjustable drawbar mounting comprising a carrying bracket secured to the frame, a drawbar supporting frame movably mounted in the bracket, and means for locking the drawbar frame in predetermined positions in the bracket, the said means comprising a releasable locking shaft assembly comprising a sleeve housing, spaced apart locking shafts in the housing, a spring between the shafts exerting a separating force therebetween, means for securing the shafts to the housing for operation therewith, and operating members for the shafts to rotate the shafts while retracting them from their normal locking engagement with the bracket.

7. A device of the character described, comprising the combination with a vehicle frame, of an adjustable drawbar mounting comprising a substantially U-shaped carrying bracket secured to the frame, a drawbar supporting frame adjustably mounted in the bracket, and means for effecting adjustment of the drawbar frame for rigidly and pivotally positioning the frame in the bracket, the said means comprising a shaft mounted forwardly in the frame and adapted to engage the bracket, lever members on the shaft for rotating the shaft, actuating means under control of an operator to actuate the lever members to rotate the shaft, a shaft assembly rearwardly mounted in the drawbar frame, including a pair of locking shafts normally yieldably interlocking with the bracket, a housing for the shafts and operable therewith, means for retracting the shafts from locking engagement with the bracket to allow movement of the drawbar frame relatively thereto, and means operatively interconnecting the shaft assembly with the said lever members of the first mentioned shaft, whereby operation of this shaft is transmitted to the shaft assembly to unlock the drawbar frame.

8. A device of the character described, comprising the combination with a dolly, of a bracket rigidly mounted on the dolly, an adjustable drawbar supporting member mounted in the bracket for longitudinal movement relatively thereto, and instrumentalities for adjusting the drawbar member relatively to the bracket and for releasably locking the member in predetermined adjusted position, the said instrumentalities enabling the dolly to be maintained steady while attaching motive power thereto and allowing the dolly to be freely drawn around upon attachment thereto of the motive power.

9. A device of the character described, comprising the combination with a vehicle frame, of a bracket rigidly mounted in the frame, an adjustable drawbar supporting member mounted in the bracket, means for securing the supporting member in predetermined positions of adjustment, instrumentalities for releasing the securing means to allow for the said adjustment of the drawbar supporting member, and mechanism for automatically locking the securing means upon the said adjustment being effected, whereby the drawbar supporting member is secured, predeterminately, in rigid and pivoted positions of adjustment relatively to the bracket.

10. A device of the character described, comprising the combination with a dolly, of draft devices including a drawbar and tongue, and instrumentalities whereby the drawbar and tongue may be moved from a rigid position to a pivoted position relatively to the dolly incident to the application of draft to the tongue.

11. A device of the character described, comprising the combination with a dolly, of draft devices including a drawbar and tongue, and instrumentalities whereby the drawbar and tongue may be moved from a rigid position to a pivoted position relatively to the dolly, the said instrumentalities comprising cooperating locking bolts for releasably locking the drawbar and tongue in either position upon attaching motive power to the dolly.

12. In combination with a trailer, a dolly for temporarily supporting and enabling movement of the trailer, instrumentalities for securing said dolly to the trailer, a drawbar for the dolly, and instrumentalities for mounting the drawbar on the dolly, said instrumentalities normally maintaining said drawbar in rigid draft position relatively to the dolly and being releasable to enable the drawbar to assume incident to the application of draft to the drawbar after the dolly has been secured to the trailer a second and freely pivoted draft position.

13. In combination with a trailer having a fifth wheel mounted thereon, a dolly for supporting and enabling movement of the trailer and having a cooperating fifth wheel rigidly mounted thereon and engageable with the trailer fifth wheel, instrumentalities for connecting and disconnecting said fifth wheels to respectively connect and disconnect the dolly and trailer, a drawbar for the dolly, and bodily movable mounting means for the drawbar for normally maintaining the drawbar in rigid draft position but enabling freely pivotal movement of the drawbar relatively to the dolly when the dolly is connected to the trailer.

14. A dolly of the character described, comprising in combination, a frame, a drawbar, drawbar supporting instrumentalities including a pair of guide brackets mounted on the frame, and a pair of horizontally spaced shafts carried by the drawbar and extending transversely of the frame for slidable engagement with the guide brackets, instrumentalities for normally retaining both of said shafts in engagement with said guide brackets whereby to dispose said drawbar in rigid draft position relatively to said frame, and instrumentalities for releasing one of said shafts from said brackets to afford free pivotal movement of said drawbar about the other of said shafts.

15. A dolly of the character described, comprising in combination, a frame, a drawbar, drawbar supporting instrumentalities including a pair of guide brackets mounted on the frame and a pair of longitudinally movable horizontally spaced shafts carried by the drawbar and extending transversely of the frame for slidable engagement with the guide brackets, instrumentalities for normally retaining both of said shafts within said guide brackets whereby to dispose said drawbar in rigid draft position relatively to said frame, and instrumentalities for releasing said shafts for longitudinal movement thereof relatively to said brackets whereby to enable the withdrawal of said shafts out of said brackets and afford free pivotal movement of said drawbar about the other of said shafts.

16. A dolly of the character described, comprising, in combination, a frame, a drawbar, drawbar supporting instrumentalities including a pair of spaced inwardly facing channel members forming guide brackets mounted on the frame and a pair of horizontally spaced shafts carried by the drawbar and extending transversely of the frame with their free extremities in sliding engagement with the guide brackets, instrumentalities for normally retaining both of said shafts in engagement with said guide brackets whereby to dispose said drawbar in rigid draft position relatively to said frame, and instrumentalities for releasing one of said shafts from said brackets to afford free pivotal movement of said drawbar about the other of said shafts.

17. A dolly of the character described, comprising a guide frame, a drawbar, a drawbar supporting frame longitudinally movable into and from said guide frame and normally positioned within the guide frame, instrumentalities interconnecting said guide and drawbar frames and admitting of pivotal movement of the drawbar frame, the interconnection being such that when the drawbar frame is within the guide frame, the drawbar will be maintained in a rigid draft position relatively to the dolly, and when the drawbar supporting frame is longitudinally extended from the guide frame the drawbar will assume a pivotal draft position relatively to the dolly, and instrumentalities for selectively maintaining said drawbar frame in such positions.

18. A dolly of the character described, comprising a guide frame, a drawbar, a drawbar supporting frame longitudinally movable into and from said guide frame and normally positioned within the guide frame, instrumentalities interconnecting said guide and drawbar frames and admitting of pivotal movement of the drawbar frame, the interconnection being such that when the drawbar frame is within the guide frame, the drawbar will be maintained in a rigid draft position relatively to the dolly, and when the drawbar supporting frame is longitudinally extended from the guide frame the drawbar will assume a pivotal draft position relatively to the dolly, and instrumentalities for selectively maintaining said drawbar frame in such positions, the end of said guide frame from which said drawbar frame is extended being inclined and serving to align said guide and drawbar frames in the return movement of said drawbar frame within the guide frame.

19. In a dolly construction of the character described, in combination, a frame structure, a lower fifth wheel member rigidly mounted on the said frame structure, locking instrumentalities on the said lower fifth wheel member, an adjustable drawbar mounting comprising a drawbar frame mounted within the frame structure for adjustable movement therein relatively to the frame structure, means for selectively locking the drawbar frame in rigid draft and pivotal draft positions, and actuating means for the locking instrumentalities in the lower fifth wheel member operatively associated with the first mentioned means for controlling the operation of the actuating means relatively to the movement of the drawbar frame.

20. In combination with a dolly having a fifth wheel including locking instrumentalities, a shiftable drawbar, actuating instrumentalities for the locking instrumentalities, and means for holding the actuating instrumentalities in inoperative position when the drawbar is in one position of adjustment.

21. In combination with a dolly having a fifth wheel including locking instrumentalities, a shiftable drawbar, actuating instrumentalities for the locking instrumentalities, and means shiftable with the drawbar for holding the actuating instrumentalities in inoperative position when the drawbar is in one position of adjustment.

22. In combination with a dolly having a fifth wheel including locking instrumentalities, a drawbar movable to rigid or pivotal draft positions, respectively, relative to the dolly, actuating instrumentalities for the locking instrumentalities, and means for holding the actuating instrumentalities in inoperative position when the drawbar is in its pivotal position.

ROY E. WILLIAMS.